Figure 1:
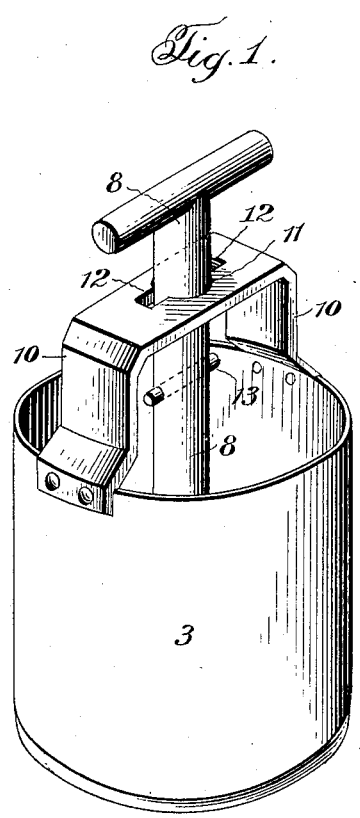

No. 829,287. PATENTED AUG. 21, 1906.
N. W. PARKER.
BUTTER MOLD.
APPLICATION FILED FEB. 5, 1906.

Witnesses
Jas. E. Hutchinson
M. F. Rowe

Inventor
Nathaniel W. Parker,
By Royal E. Burnham, Attorney

UNITED STATES PATENT OFFICE.

NATHANIEL W. PARKER, OF SOUTH GRANVILLE, NEW YORK.

BUTTER-MOLD.

No. 829,287.　　　　Specification of Letters Patent.　　　Patented Aug. 21, 1906.

Application filed February 5, 1906. Serial No. 299,534.

*To all whom it may concern:*

Be it known that I, NATHANIEL W. PARKER, a citizen of the United States, residing at South Granville, in the county of Washington and State of New York, have invented certain new and useful Improvements in Butter-Molds, of which the following is a specification, reference being had therein to the accompanying drawings.

The object of this invention is to provide a device simple in construction and efficient in operation which is adapted to be pressed into a mass of butter or similar plastic material and to withdraw a portion of the mass in the form of a compact print, which is ejected by easy operation of one hand.

The details of construction and arrangement of parts contemplated by this invention are disclosed in the accompanying drawings, forming part hereof, and wherein a preferable embodiment of the invention is shown for purposes of illustration.

In the drawings like reference characters refer to corresponding parts in the several views, of which—

Figure 2:
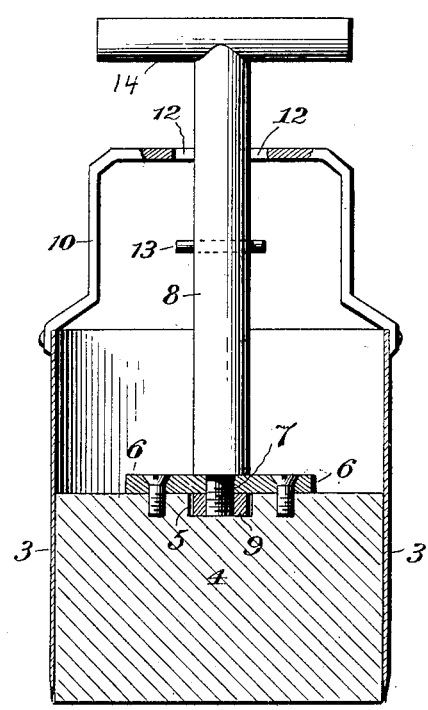

Figure 1 is a perspective view of the invention, and Fig. 2 is a sectional view thereof.

Having more particular reference to the views, 3 designates a casing open at the top and bottom and its bottom constituting a cutting edge. A mold head or piston 4 is arranged to be slidable within casing 3. Mold-head 4 is formed at its top with a centrally-located recess 5, across which is fastened an apertured strap 6. The screw-threaded reduced end 7 of a piston-rod 8 is passed through the aperture in strap 6 and held thereto by a nut 9 on end 7, recess 5 being made to accommodate this nut. By this means piston-rod 8 is rotatably connected with mold-head 4. A bail or cross member 10 is attached to the top of casing 3 and has therein an aperture 11, through which piston-rod 8 is slidably and rotatably movable. Laterally-extending slots 12 open from aperture 11 and with the aperture form a continuous elongated opening through the bail. A pin 13, slightly less in length than the distance from the end of one of slots 12 to the other, is held transversely in piston-rod 8. A handle 14 is attached to the top of piston-rod 8

The operation of the device is as follows: The piston-rod and mold-head are drawn upwardly until the pin passes above the slots in the bail, when the handle is turned, and by engagement of the pin with the bail the descent of the mold-head prevented on pressure upon the handle. The device being held by the handle, it is pressed into the mass of plastic material from which a portion is to be molded, and thus the portion of the casing below the mold-head is filled with material. The device and the material therein is then withdrawn from the mass, the handle is turned until the pin registers with the slots, the hand is placed so that the handle rests in the palm, and the fingers grasp the bail. By retraction of the fingers the bail and casing are moved with respect to the piston-rod and mold-head, the pin passing through the slots and not retarding this movement, and the print obtained from the mass ejected upon a plate or into any other suitable receptacle. It will thus be seen that the entire operation of the device may be expeditiously performed by one hand.

Having thus described my invention, what I claim as new, and desire to secure by Letters Patent, is—

A mold comprising a casing, a mold-head movable therein, and having a recess in its top, an apertured strap fastened to said mold-head across said aperture, a cross member on said casing and having an elongated opening therethrough, a piston-rod rotatably connected to said strap by a nut seated in said recess and passing through said opening, and a pin on said piston-rod and passable through said opening in one position of the piston-rod, said pin being engageable with said cross member when the relative positions of opening and pin are changed by rotation of said piston-rod.

In testimony whereof I affix my signature in presence of two witnesses.

NATHANIEL W. PARKER.

Witnesses:
　BERTHA C. PARKER,
　PERRY L. HILL.